United States Patent [19]
Gehri

[11] 3,968,550
[45] July 13, 1976

[54] HARD METAL CUTTING BIT

[75] Inventor: Hermann Gehri, Prangins, Switzerland

[73] Assignee: Stellram SA, Nyon, Switzerland

[22] Filed: Dec. 16, 1975

[21] Appl. No.: 641,354

[30] Foreign Application Priority Data
Jan. 14, 1975  Switzerland............................ 391/75

[52] U.S. Cl. .................................................. 29/95 R
[51] Int. Cl.² ............................................ B26D 1/00
[58] Field of Search ................................ 29/95, 96

[56] References Cited
UNITED STATES PATENTS

| | | | |
|---|---|---|---|
| 3,381,349 | 5/1968 | Newcomer............................. | 29/96 |
| 3,383,748 | 5/1968 | Galimberti et al. .................. | 29/95 R |
| 3,399,442 | 9/1968 | Jones et al. ........................... | 29/95 R |
| 3,786,541 | 1/1974 | Lundgren.............................. | 29/95 R |
| 3,885,281 | 5/1975 | Stambler.............................. | 29/95 R |

*Primary Examiner*—Harrison L. Hinson
*Attorney, Agent, or Firm*—Young & Thompson

[57] ABSTRACT

A hard metal cutting bit is useful both for rough cutting and for finishing, and comprises a polygonal member having parallel opposite main faces, and on at least one of the main faces a fillet that extends continuously about the edge of the main face, the fillet being concave and of greatest depth and width mid-way between the corners of the bit and of the least width and depth at the corners of the bit. A first chip breaker on the main face is next to the fillet and is of least width and depth mid-way between the corners and greatest depth and width adjacent the corners of the bit. A second chip breaker is next to the first and spaced by the first chip breaker from the fillet, and is discontinuous and concave and of greatest depth and width mid-way between the corners and terminates adjacent the corners.

4 Claims, 7 Drawing Figures

HARD METAL CUTTING BIT

The present invention relates to hard metal cutting bits of universal applicability, that is, which are equally well adapted for rough cutting and for finishing.

Hard metal cutting bits according to the invention comprise, on at least one major face thereof, a fillet extending about the entire periphery and being concave such that its width varies and increases from each corner of the bit toward the middle of each of the sides, as well as two chip breakers of different geometric characteristics. These cutting bits are characterized by the fact that the width and depth of the first chip breaker, which is separated from the cutting edge by the fillet, decreases from each corner of the bit toward the middle of each of the sides, and by the fact that the first chip breaker is continuous over the entire peripheral zone of the bit, and by the fact that there is a second chip breaker which is concave and discontinuous and terminates in the first chip breaker and whose depth and width vary, the greatest depth and width of the second chip breaker being located at the middle of each side of the bit.

The accompanying drawings show schematically by way of example one embodiment of the cutting bit according to the present invention. In the drawings.

Figure 1:
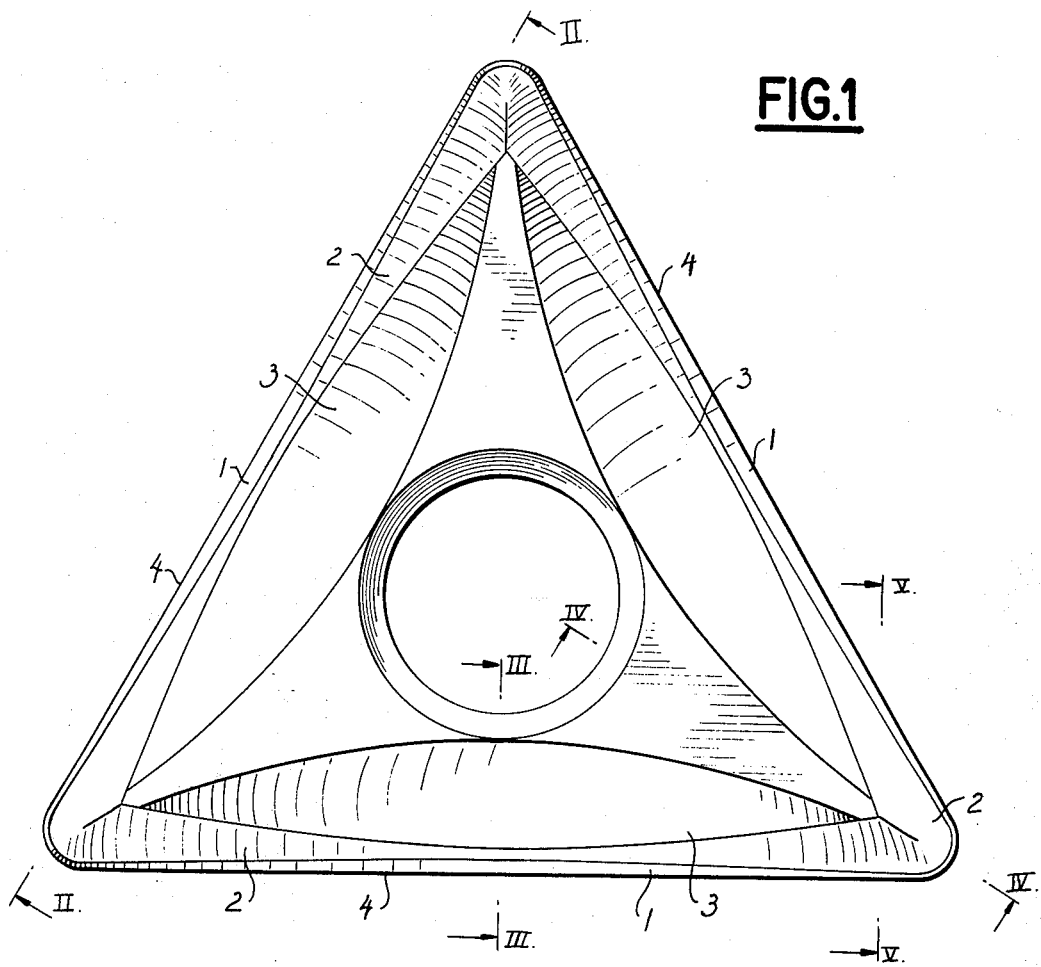
FIG. 1 is a plan view of the cutting bit.
Figure 2:
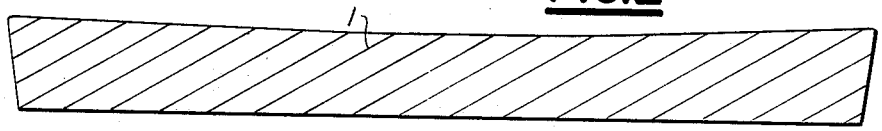
FIG. 2 is a partial cross section on the line II—II of FIG. 1.

In the illustrated example, the hard metal cutting bit is of generally triangular form; however it could have a different number of sides.

At least one of its faces, which is the upper face in the illustrated embodiment, has a particular configuration; it is provided with a fillet 1 and two chip breakers 2 and 3.

The fillet 1, whose purpose is to strengthen the cutting edge 4 of the bit, is continuous, that is, it extends about the entire periphery of the face in question of the bit. As it is concave, this fillet has a variable width, which is a minimum adjacent the corners of the bit and increases to a maximum at the middle of the sides of the bit.

The first chip breaker 2 is also continuous and extends entirely about the bit; by virtue of the fact that the second chip breaker 3 connects to it, it has a depth and width that vary. This depth and this width are at a minimum at the middle of each side of the bit and achieve a maximum value adjacent the acute angles of this bit.

Adjacent the corners of the bit, the shape of the first chip breaker is not modified by the second. From a relatively small depth and width, it creates in this zone a construction which, as seen in the section IV—IV, is relatively narrow and prevents a chip of small cross section from slipping toward the adjacent cutting edge. Thus the characteristics of the first chip breaker 2, in combination with the characteristics of the fillet 1, permit the bit to be used for finishing passes, that is, of small cutting depth and small advance per turn of the workpiece.

Figure 4:
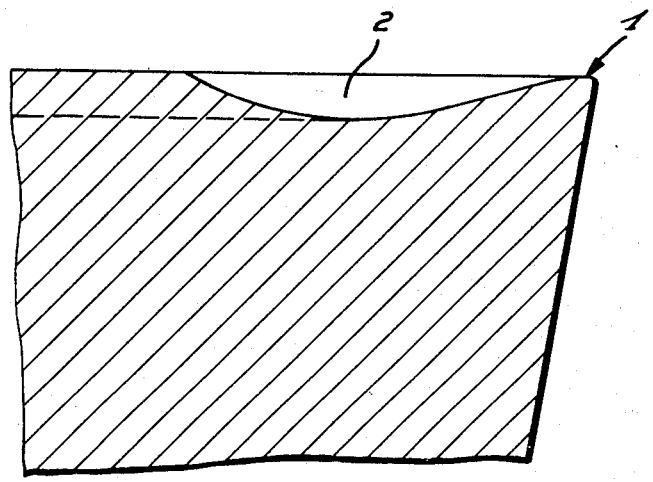
FIGS. 4 and 5 are partial cross sections along the lines IV—IV and V—V, respectively, of FIG. 1.
Figure 5:
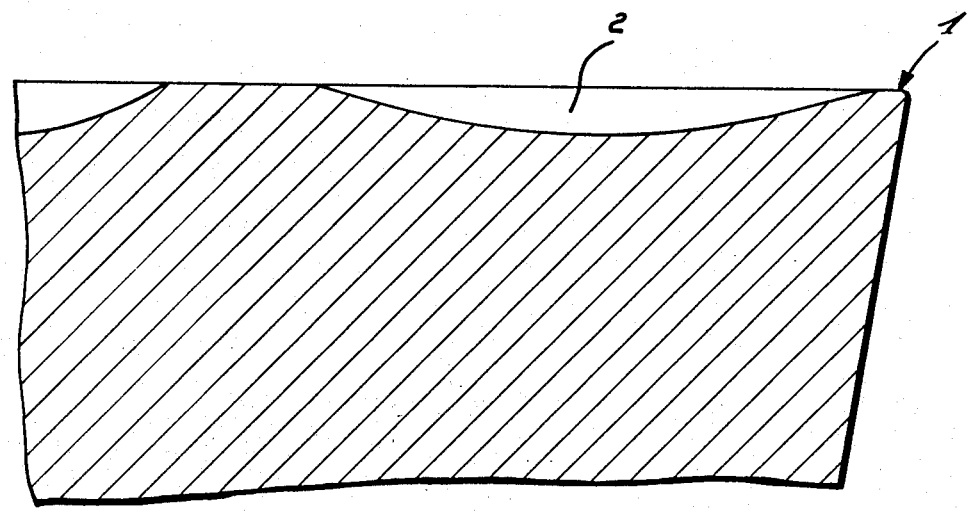

FIGS. 4 and 5 clearly illustrate that at the corners of the bit only the fillet 1 and the first chip breaker 2 are present.

The second chip breaker 3, concave lengthwise and discontinuous, extends only along the sides of the bit without turning the corners and terminates in the first chip breaker 2. This second chip breaker also has a variable width and depth, but these variations are in the opposite sense to those of the first chip breaker. Thus the maximum depth as well as the maximum width of the second chip breaker is located at the middle of each side and these values diminish in the direction of the corners of the bit.

During rough cutting passes, that is, of great cutting depth and great advance per turn of the workpiece, the chips occupy the large and deep zone created by the second chip breaker which permits them to form well. Moreover, this chip breaker being concave in the lengthwise direction, the chips are immediately removed from the workpiece on the one hand and from the opposed cutting edge on the other hand, both of which are thus protected. This characteristic is particularly important when milling, where the chips must "rise" to be ejected from the recesses that are cut for them on the milling cutter.

Figure 3:
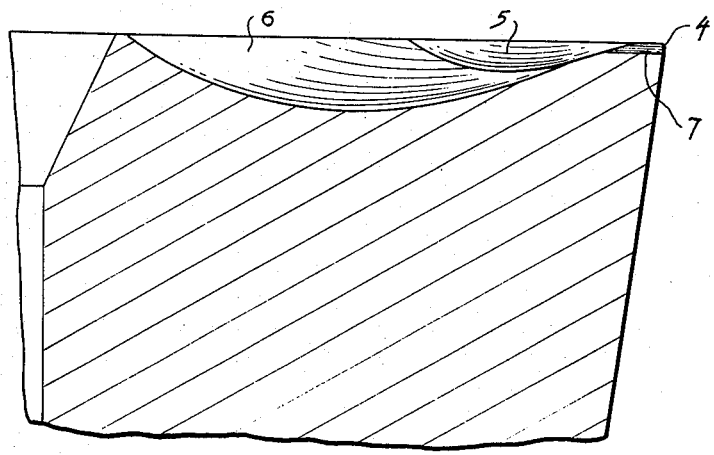
FIG. 3 is a section along the line III—III of FIG. 1.

FIG. 3 clearly illustrates the differences of width and depth of the two chip breakers. The area 5 represents the depression formed by the first chip breaker and the area 6 that formed by the second chip breaker. The area 7 represents the depression formed by the concavity of the fillet and illustrates the variation of its width between the highest point of the cutting edge 4, that is, the cutting point, and the middle of the length of this edge, that is, the section line III—III of FIG. 1.

The principal advantage of the described cutting bit is thus its universality. This characteristic is clearly illustrated by the curves of FIGS. 6 and 7, which have been determined in the course of tests effected on such bits and which represent two examples of the field of use.

Figure 6:
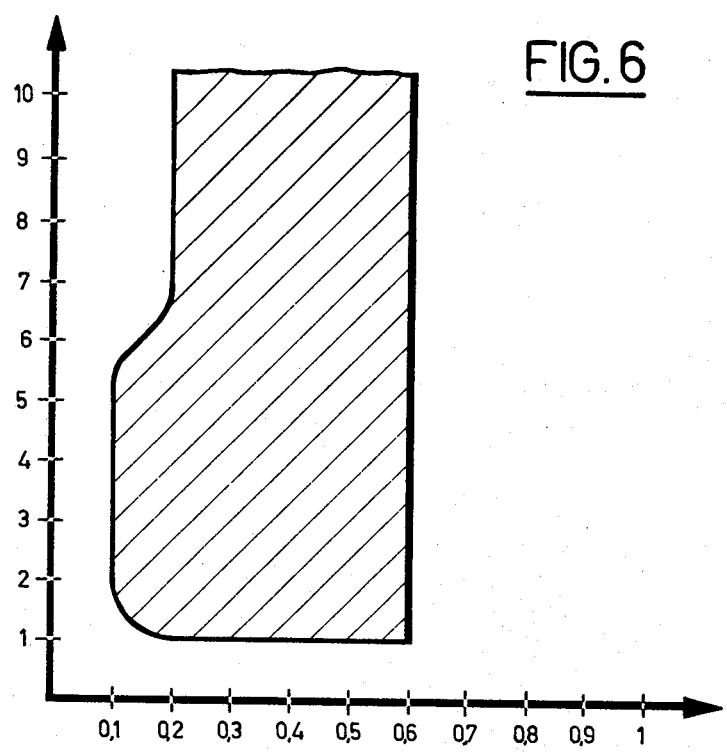
FIGS. 6 and 7 show examples of the mode of use of such a bit.

In FIG. 6, there is shown an example of operation comprising the turning of a workpiece in the form of a cylindrical shaft of steel whose tensile strength is 50 kg/mm$^2$ and whose diameter is 125 mm. The shaft turns with a tangential peripheral velocity of 114 m/min. The cutting bit is as shown in FIG. 1, that is, triangular, with a nose angle or angle between the sides, of 60 degrees. The radius of the cutting point is 0.8 mm. The cutting bit is positioned at an angle of attack of 93 degrees, that is, the angle between the principal plane of the cutting face and the axis of the uncut portion of the workpiece.

On the ordinate of FIG. 6 is shown the depth of cut, in millimeters; while on the abscissa is shown the distance of advance per turn of the workpiece, in millimeters. The shaded area indicates the area of good chip formation, the region to the right of the shaded area indicating an area of too great load, in which the cutting bit may break.

Figure 7:
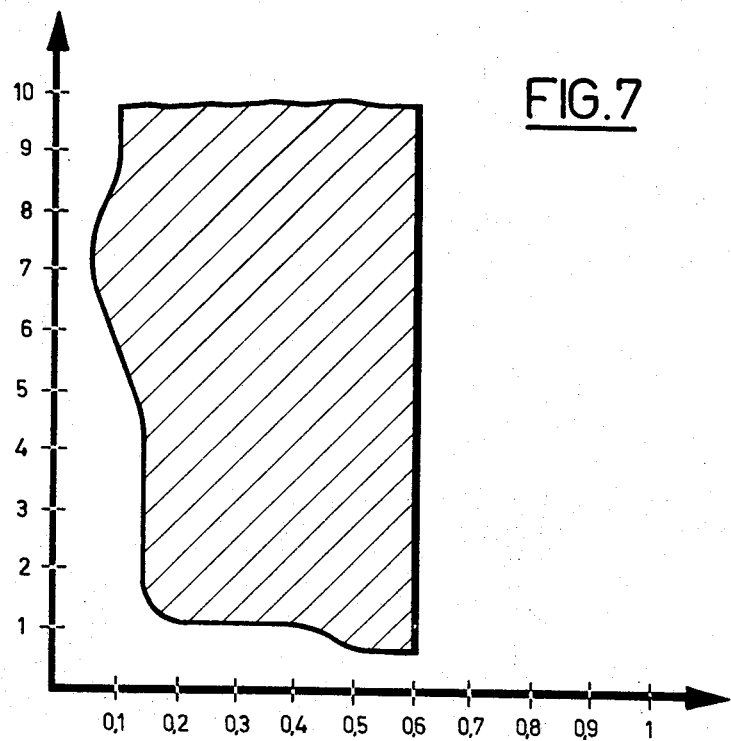

FIG. 7 is similar to FIG. 6, except that the workpiece has a tensile strength of 85 kg/mm$^2$ and turns with a tangential peripheral velocity of 101 m/min.

The cutting bit may have sides that are perpendicular or tapered. The bit may be reversible if its two faces have the described chip breakers.

Although the present invention has been described and illustrated in connection with the preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A polygonal hard metal cutting bit comprising on at least one of its faces a fillet extending about the entire periphery of the bit, the fillet being concave between the corners of the bit, the bit also having two chip breakers on each side of the bit, a first of said chip breakers being next to said fillet and having a width and depth that are maximum adjacent the corners of the bit and a minimum mid-way between the corners of the bit, the second of said chip breakers being concave and discontinuous and being at least partly spaced from the fillet by said first chip breaker and having a depth and width that vary, the greatest depth and the greatest width of said second chip breaker being adjacent the middle of each side of the bit.

2. A cutting bit as claimed in claim 1, the width of the fillet being variable and increasing from a minimum adjacent the corners of the bit to a maximum adjacent the mid-point of each side of the bit.

3. A cutting bit as claimed in claim 1, said first chip breaker being continuous about the entire periphery of the bit, said second chip breaker being entirely spaced from the fillet by said first chip breaker.

4. A cutting bit as claimed in claim 1, which has two principal faces and is triangular when viewed in a direction perpendicular to said principal faces, said principal faces being parallel to each other.

* * * * *